Mar. 3, 1925.

J. J. CONWAY 1,528,404

SCISSORS AND SHEARS

Filed Jan. 28, 1924

Inventor
John J. Conway
By Wooster Davis
Attorneys

Patented Mar. 3, 1925.

1,528,404

UNITED STATES PATENT OFFICE.

JOHN J. CONWAY, OF BRIDGEPORT, CONNECTICUT, ASSIGNOR TO THE ACME SHEAR COMPANY, OF BRIDGEPORT, CONNECTICUT, A CORPORATION OF CONNECTICUT.

SCISSORS AND SHEARS.

Application filed January 28, 1924. Serial No. 689,056.

*To all whom it may concern:*

Be it known that I, JOHN J. CONWAY, a citizen of the United States, residing at Bridgeport, county of Fairfield, State of Connecticut, have invented a new and useful Scissors and Shears, of which the following is a specification.

This invention relates to scissors and shears, particularly to the pivotal connection for the blades thereof.

It has for an object to provide a pivot for this type of devices which will not work loose in operation, which may be easily adjusted to tighten or loosen the pivotal connection, which will be very simple in construction and which may be quickly and easily assembled.

With the foregoing and other objects in view, I have devised the construction illustrated in the accompanying drawing forming a part of this specification, similar reference characters being employed throughout the various figures to indicate corresponding elements. In this drawing, Fig. 1 is a top plan view of a pair of shears, a portion of the head of the screw being broken away to show a portion of the construction of the pivot.

Figure 1:
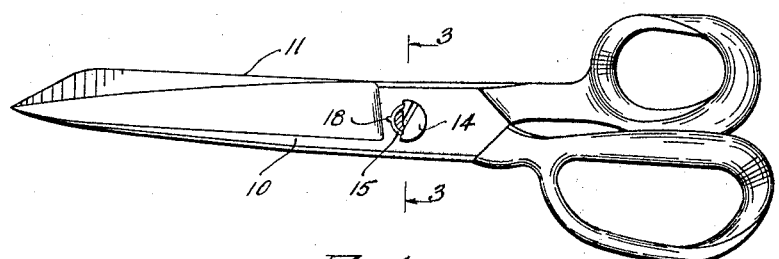
Figures 2, 3:
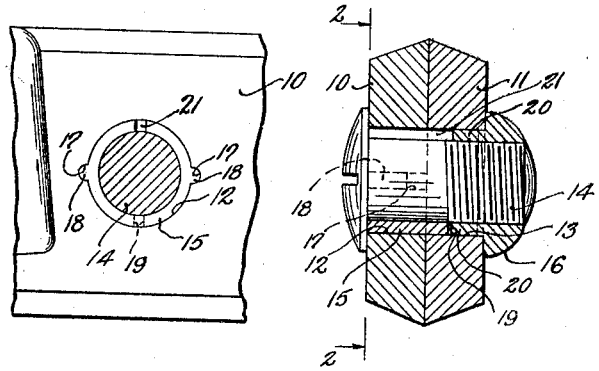
Fig. 2 is a detailed view on an enlarged scale taken substantially on line 2—2 of Fig. 3.
Fig. 3 is a transverse section through the pivot substantially on line 3—3 of Fig. 1 and on an enlarged scale.
Figure 4:
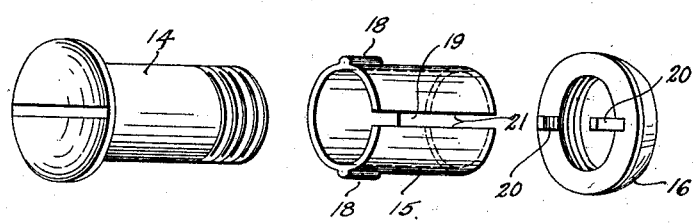
Fig. 4 is a perspective view of the three elements of the pivot separated.

The scissors or shears comprises the usual top blade 10 and bottom blade 11 overlapping in the usual manner. These blades are provided with aligned openings 12 and 13 respectively, extending therethrough for the pivotal connection. This pivotal connection comprises three elements, a screw 14, a tube or sleeve 15 and a nut 16 adapted for threaded engagement with the screw. In applying the pivotal connection the tube or sleeve 15 is locked or anchored to one of the blades, preferably the top blade 10, so that it cannot turn in this blade but it is loose in the other blade so that this blade can turn on the tube. The nut 16 which is located on the outer side of the second blade is locked or anchored to the tube so that it cannot turn relative thereto, and the screw 14 extends through the tube from the opposite end and has threaded engagement with the nut.

As a means for locking the tube to the first blade, the blade is preferably provided with one or more recesses or grooves 17 in the sides of the opening therethrough, and the tube or sleeve 15 is provided with one or more external projections, such as ribs 18, adapted when placed in the blade 10 to extend into the recess or grooves 17 and preventing turning movement of the sleeve in the blade. For locking the nut to the tube or sleeve this sleeve is preferably provided at its opposite end with one or more notches 19, and the nut is provided with one or more inwardly projecting lugs 20, projecting into this notch or notches so as to prevent turning movement of the nut with respect to the tube. To facilitate insertion of the tube in the first blade and also to allow easy removal if desired, the tube is preferably made of resilient metal and slit at one side thereof, as shown at 21. Thus by pressing the sides of the tube together it may be placed in the blade 10, and when released will expand firmly holding the projections 18 in the recesses 17. It may be removed by pressing the sides together and thus withdrawing the ribs or loosening them in the grooves. The slit 21 may take the place of one of the notches 19 to receive one of the lugs 20 on the nut. The lugs 20 are also preferably threaded so as to have threaded engagement with the screw and increase the holding effect.

In assembling, the tube is placed in the first blade 10 as described with its end substantially flush with the outer surface of this blade. The other blade 11 is then placed on the projecting end of the tube and the nut placed in position at the outer side of this blade with the lugs 20 projecting into the notches 19 or slit 21 in this tube. The screw 14 is then inserted from the opposite side of the tube and threaded into the nut, and it may be tightened as desired to give the required tightness between the blades. It will be apparent that the assembling operation is a very simple one and may be easily and quickly performed. It will also be noted that the tube or sleeve 15 is rigidly connected or locked to the blade 10 so that there can be no relative turning movement between them, and that the nut will be locked to the tube so that it cannot turn relative to the tube. Thus after the pivotal connection is assembled there is no relative turning movement between the head of the screw and the blade 10 so that there is nothing to loosen the screw in the tube and the nut. The relative turning movements are all between the other blade 11 and the nut and tube. As the nut is locked to the tube and the tube is locked to the first blade the pivot may be tightened as desired by merely applying a screw driver to the screw without any danger of the nut or tube turning in the blades.

Figure 5:
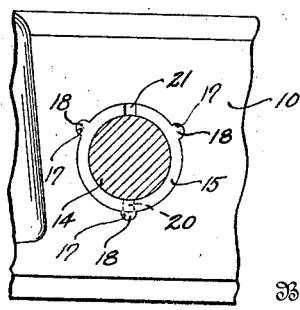
Fig. 5 is a view similar to Fig. 2 showing a slightly different construction.

In Fig. 5 is shown a slightly different construction in which the number of ribs 18 and recesses or grooves 17 have been increased to give a more secure locking connection between the blade and the tube. The number of these grooves and ribs may, however, be varied as desired as it may be found in some instances one alone will be sufficient. The number of lugs 20 on the nut and the corresponding notches in the end of the tube for receiving them may also be varied as is found desirable.

Having thus set forth the nature of my invention what I claim is:

1. Scissors, shears or the like, comprising a pair of blades having aligned openings therethrough, a longitudinally slit, resilient tube in said openings, said tube and one of said blades being provided with interlocking means held in engagement by the resiliency of the tube to prevent turning of the tube in the blade, said tube being provided with one or more notches leading longitudinally inward from its opposite end, a nut at the outer side of the other blade provided with one or more lugs projecting longitudinally directly from and beyond the inner end thereof and extending into said notch or notches to prevent rotation of the nut, and a headed screw extending into the tube from the opposite end and having threaded engagement with the nut.

2. Scissors, shears or the like comprising a pair of blades having aligned openings therethrough, a tube in said openings, means for locking the tube in one of said blades, said tube being provided with one or more notches leading longitudinally inward from the other end, a nut having one or more lugs projecting longitudinally directly from and beyond the inner end thereof and extending into said notch or notches, and a headed screw extending into said tube from the opposite end and having threaded engagement with the nut.

In testimony whereof I affix my signature.

JOHN J. CONWAY.